United States Patent
Fruth (10) Patent No.: US 7,126,711 B2
(45) Date of Patent: Oct. 24, 2006

(54) VOICE/FACSIMILE/MODEM CALL DISCRIMINATION METHOD FOR VOICE OVER PACKET NETWORKS

(75) Inventor: Frank E. Fruth, Gaithersburg, MD (US)

(73) Assignee: Texas Instruments Incorporated, Dallas, TX (US)

( * ) Notice: Subject to any disclaimer, the term of this patent is extended or adjusted under 35 U.S.C. 154(b) by 935 days.

(21) Appl. No.: 10/029,847

(22) Filed: Dec. 31, 2001

(65) Prior Publication Data

US 2003/0123097 A1 Jul. 3, 2003

(51) Int. Cl.
*G06F 15/00* (2006.01)
(52) U.S. Cl. ............ 358/1.15; 358/407; 358/405; 358/412; 370/464; 370/465; 370/468; 370/473; 370/493; 370/494
(58) Field of Classification Search ............... 358/407, 358/405, 412, 1.15; 370/464, 465, 468, 473, 370/493, 494
See application file for complete search history.

(56) References Cited

U.S. PATENT DOCUMENTS

| 6,768,791 B1 * | 7/2004 | Olafsson et al. ........ 379/93.32 |
| 2002/0015415 A1 * | 2/2002 | Sugino et al. ............ 370/465 |
| 2002/0064168 A1 * | 5/2002 | Garakani et al. .......... 370/410 |
| 2002/0114017 A1 * | 8/2002 | Ono et al. ............ 358/426.04 |
| 2002/0154685 A1 * | 10/2002 | Olafsson .................... 375/222 |
| 2003/0123466 A1 * | 7/2003 | Somekh et al. ............ 370/401 |

FOREIGN PATENT DOCUMENTS

WO  WO 01/22710 A  3/2001
WO  WO 01/91441 A  11/2001

OTHER PUBLICATIONS

McCallum, Ian; TR30.5 Ad-hoc report on V.moip/T.38 Interworking Issues; Telecommunications Industry Association (TIA), Committee Contribution, Technical Committee TR30 Meeting; Mar. 5-9, 2001, 5 pages; XP-002324223, TR-30.5/01-03-006, TR-30.1/01-03???; St. Petersburg, FL.

Series T: Terminals For Telematic Services (Procedures for real-time Group 3 facsimile communication over IP networks); International Telecommunication Union (ITU); Telecommunication Standardization Sector of ITU (ITU-T); XP-002163782; T.38 (Jun. 1998).

(Continued)

*Primary Examiner*—Kimberly Williams
*Assistant Examiner*—Michael Burleson
(74) *Attorney, Agent, or Firm*—Steven A. Shaw; W. James Brady; Frederick J. Telecky, Jr.

(57) ABSTRACT

A method of discriminating voice, data, and facsimile calls communicated through a voice-over-packet network. The gateway is provided with software which can identify the existence of an answer signal (ANS) or a modified answer signal (ANSam) communicated between an answering modem and an originating modem over a packet network during a voice state call. The originating gateway can generate an ANS tone according to the protocols of the originating modem, using an originating-side gateway, when the existence of the ANS signal is identified by the receiving-side gateway. The originating gateway also generates an ANSam tone according to the protocols of the originating modem, using the originating-side gateway, when the existence of the ANSam signal is identified by the receiving-side gateway.

13 Claims, 4 Drawing Sheets

OTHER PUBLICATIONS

Series V: Data Communication Over The Telephone Network (procedures for starting sessions of data transmission over the public switched telephone network); International Telecommunication Union (ITU); Telecommunication Standardization Sector of ITU (ITU-T); XP-002324222; V.8 (Nov. 2000).

Somekh, Oren; (1) Modem Over Packet Networks Technology; International Telecommunication Union (ITU-T G.114) General Characteristics of international telephone connections and international telephone circuits-one-way transmission time; (2) ITU-T H.323 Annex P (Draft) Real time modem relay over H323 system.

Schulzrinne, H; Petrack, S.; RTP Payload for DTMF Digits, Telephony Tones and Telephony Signals; Network Working Group Columbia University (MetaTel); Standards Track; May 2000.

* cited by examiner

VOICE/FACSIMILE/MODEM CALL DISCRIMINATION METHOD FOR VOICE OVER PACKET NETWORKS

FIELD OF THE INVENTION

The invention relates to the discrimination of voice, data, and facsimile communications that are transported, over a portion of the end-to-end communication link, by a packet network.

BACKGROUND OF THE INVENTION

Simple G.711 pass-through has proven to be an inadequate method of transmitting data-modem traffic over packet networks that experience packet loss. The loss of packets in a communication disrupts the transmitting modem's signal, causing the connection to fail and reducing the data throughput of the channel. This is a real and growing problem in the current Voice-over-Internet Protocol (VoIP) market.

One possible remedy to alleviate the problem would be to incorporate Forward Error Correction (FEC) techniques to help recover G.711 data lost over the network. The simplest FEC technique to employ would be data redundancy, whereby each network packet contains data from previous network packets in addition to its own data. This approach offers a low implementation complexity at the cost of more network bandwidth and is an attractive approach for high-density systems.

Figure 1:
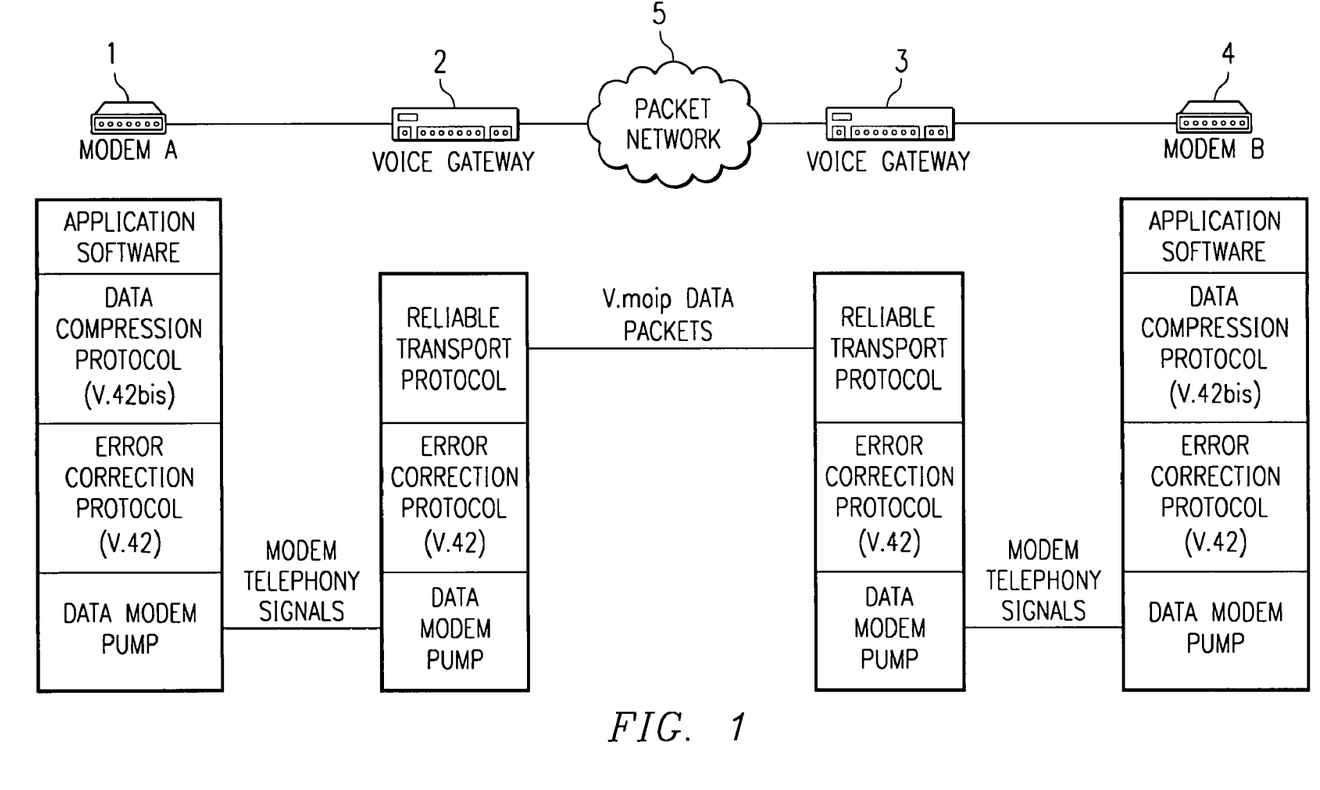
FIG. 1—illustrates the basic communication structure of a modem relay employing a packet network communication link.

An alternative approach is to terminate locally all modem signals at each gateway and exchange demodulated data between the gateways over the packet network using a reliable packet transport protocol. FIG. 1 illustrates an example of this Modem over IP (MoIP) concept currently being implemented.

A major challenge to deploying any successful MoIP implementation requires a robust modem/facsimile call discrimination mechanism which must be capable of detecting, identifying and discriminating between modem and facsimile signals so that the proper processing can be activated at each gateway. The detection, classification and change of processing must be done in such a way as not to cause interoperability problems which can result in unacceptable high modem/facsimile call failure rates or voice quality degradation.

Figure 2A:
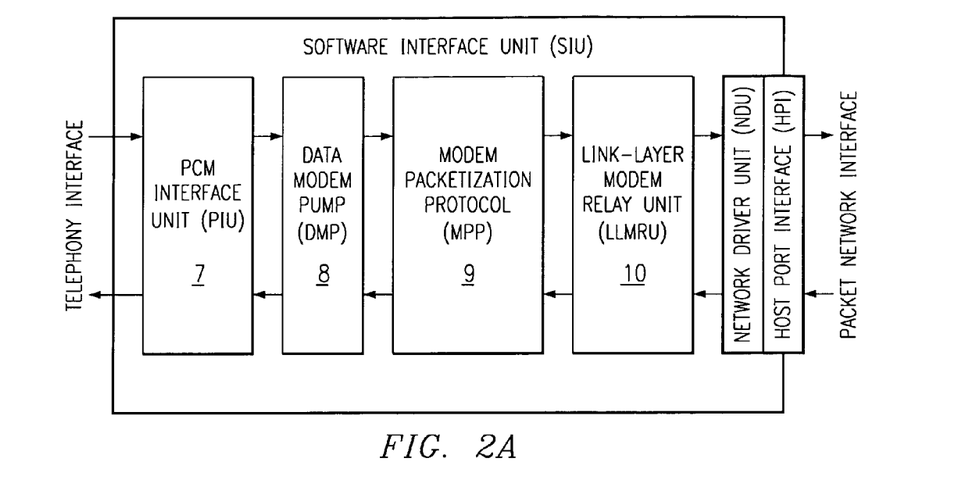
FIGS. 2A and 2B—illustrates a digital signal processor channel architecture for the link-layer modem relay channel state and the digital signal processor channel architecture for the link layer facsimile relay.

To overcome the drawbacks of the prior art, a new channel state, called the link-layer modem relay (LLMR), is added to the DSP, although it is common to use a DSP, use of other processors or formats is within the scope of the present invention. The LLMR is responsible for link-layer modem relay processing. FIG. 2A illustrates the DSP channel architecture for a LLMR channel state. In this state, pulse code modulation (PCM) samples are received by the PCM interface unit 7 and processed by the Data Modem Pump (DMP) 8. The DMP implements V-series voice-band data modem processing and demodulates the incoming data stream. The modem packetized protocol (MPP) 9 performs high-level data link control (HDLC) processing on the received data and passes the decoded HDLC data to the Link-layer Modem Relay Unit (LLMRU) 10. The LLMRU 10 performs local V.42 processing and packetizes the data for transmission over the packet network. Likewise, modem data received from the packet network is converted to a V.42 data stream and passed to the MPP 9 for modulation by the DMP 8.

Figure 2B:
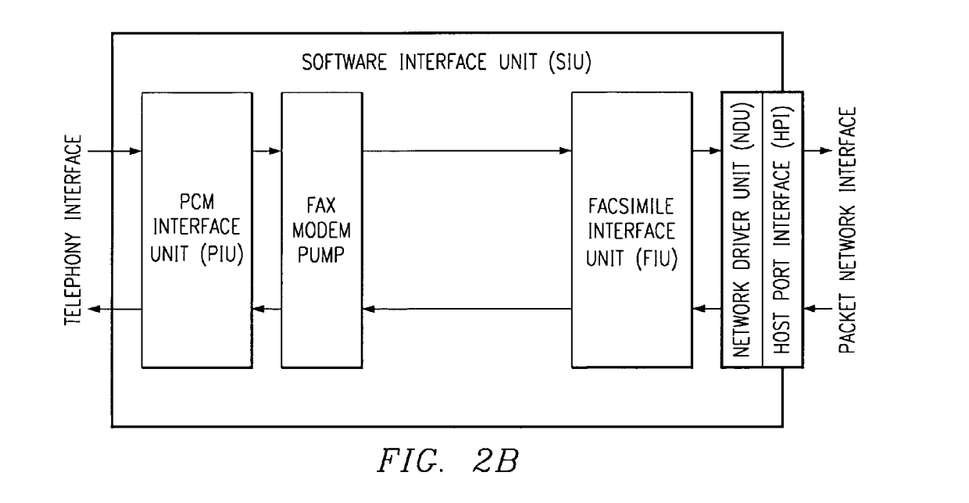

Similarly, as illustrated in FIG. 2B, a facsimile channel state is used for handling facsimile traffic over packet networks. The facsimile modem (FM) pump implements V-series voice-band facsimile modem processing and facsimile interface unit (FIU) packets, the facsimile protocol communication in a format suitable for transmission over a packet network.

SUMMARY OF THE INVENTION

Incorporating the above link-layer modem relay capability requires the ability to perform call discrimination and application software switch-over. It is desirable to support facsimiles (including V.34), high-speed data modems employing LAPM (V.34 and above), and lower speed data modems (e.g., V.32bis, V.22bis, V.23, V.21, Bell 103, Bell212) simultaneously. This disclosure defines a call discrimination algorithm that supports the desired requirements and defines the specific enhancements to existing voice software to support this algorithm.

A preferred method of discriminating voice, data, and facsimile calls communicated through a voice-over-packet network 5 includes a subset of the following steps of:

(1) identifying the existence of an answer signal (ANS) or a modified answer signal (ANSam) communicated between an answering modem and an originating modem over a packet network; and (2) generating an ANS tone according to the protocols of the originating modem, using an originating-side gateway, when the existence of the ANS signal is identified by the answering side gateway in accordance with RFC2833;

(3) generating an ANSam tone according to the protocols of the originating modem, using the originating-side gateway, when the existence of the ANSam signal is identified by the answering side gateway in accordance with RFC2833;

(4) enabling a V.8 call menu signal CM detector after the existence of either of the ANS or ANSam signals is identified by the originating gateway;

(5) transitioning the originating gateway from a voice mode of operation to a G.711 pass-through mode of operation after the existence of either of the ANS or ANSam signals is identified by the originating gateway;

(6) detecting a V.8 CM signal transmitted by the originating gateway at the originating gateway and suppressing its transmission into the packet network;

(7) identifying the CM call function as either (a) facsimile and modifying channel processing to either FoIP processing mode of operation or remain in G.711 pass-through mode of operation or (b) data modem and modifying channel processing to MoIP processing mode of operation;

(8) identifying the termination of the communication of the ANS or the ANSam signal;

(9) terminating the generation of the ANS or the ANSam tone when the termination of the communication of the ANS or the ANSam signal is identified; and (10) disabling the V.8 CM detector when the termination of the communication of the ANS or the ANSam signal is identified; and (11) after executing step (10), transitioning the originating gateway to a facsimile relay processing mode of operation when a facsimile relay indication is received from the answering-side gateway over the packet network.

Another preferred method of discriminating voice, data, and facsimile calls communicated through a voice-over-packet network includes a subset of the following steps of:

(1) identifying any one of an answer signal (ANS), a modified answer signal (ANSam), a V.8bis CRe tone, or V.21 flags communicated between an answering modem and an originating modem, using an answering-side gateway that is capable of identifying each of the ANS signal, the ANSam signal, the V.8bis CRe tone, and the V.21 HDLC flags;

(2) with the answering-side gateway, converting the identified ANS signal, ANSam signal, V.8bis CRe tone, or V.21 flags to a format that may be conveyed over the packet network to the originating modem via an originating-side gateway;

(3) suppressing a voice path to the packet network, using the answering gateway, when the V.8bis CRe tone is identified;

(4) determining when the V.8bis CRe tone communication between the answering modem and the originating modem terminates;

(5) re-establishing the voice path when the V.8bis CRe tone terminates;

(6) suppressing the voice path to the packet network, using the answering gateway, when the ANS signal or the ANSam signal is detected;

(7) transitioning the answering gateway to a G.711 pass-through mode of operation when the ANS signal or the ANSam signal is detected;

(8) transitioning the answering gateway to an LLMR processing mode of operation when the LLMR indication is received from the originating-side gateway;

(9) transitioning the answering gateway 3 to a V.34 facsimile processing mode of operation when the V.34 facsimile relay indication is received from the originating-side gateway;

(10) re-establishing the voice path to the packet network 5, using the answering gateway 3, when a termination of the communication of either of the ANS or ANSam signals occurs;

(11) after executing step 12, transitioning the answering gateway 3 to a facsimile relay processing mode of operation when the V.21 flags are identified.

BRIEF DESCRIPTION OF THE DRAWINGS

Preferred embodiments of the invention are discussed hereinafter in reference to the drawings, in which.

DETAILED DESCRIPTION OF THE INVENTION

Figure 3:
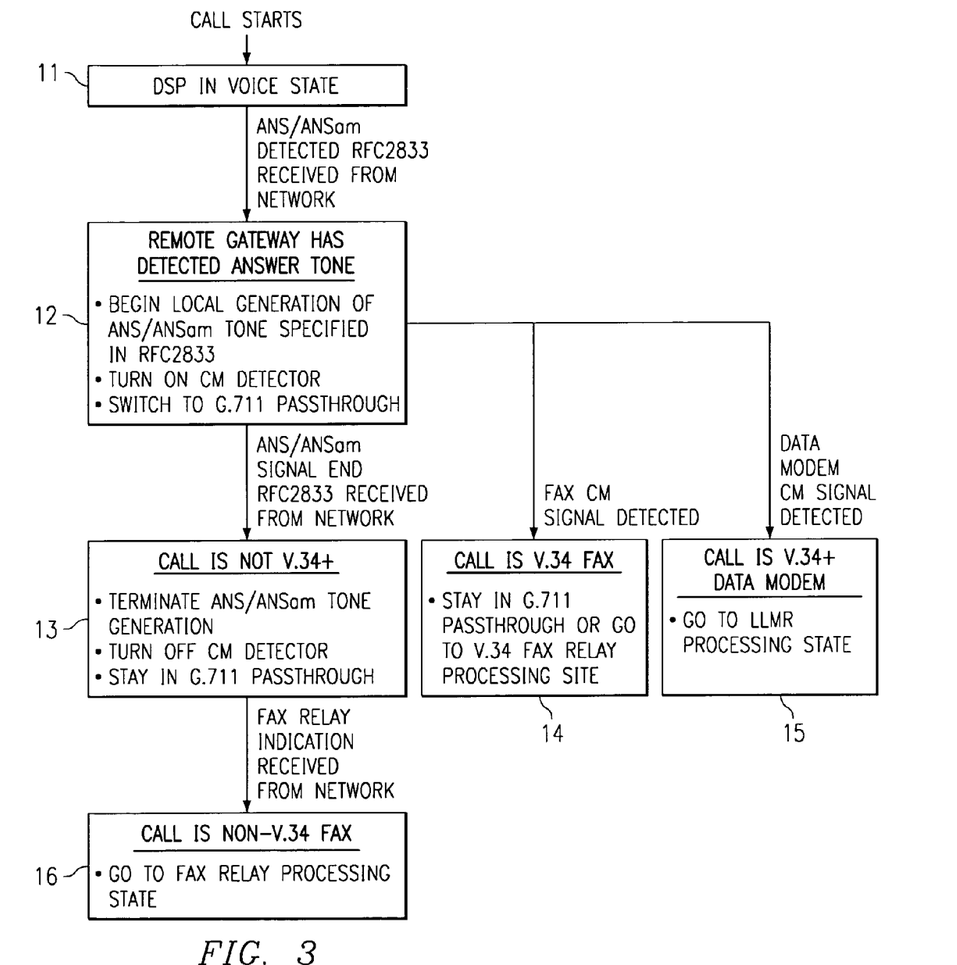
FIG. 3—illustrates the call discrimination algorithm performed by the call-origination gateway of FIG. 1.

FIG. 3 illustrates the call discrimination algorithm performed by the call-origination gateway 2 of FIG. 1, which is connected to the modem 1 originating a telephony call. After a call connection is established, the originating gateway 2 is initialized to a voice mode 11. While in this state, the originating gateway 2 monitors the packetized datastream generated by the call-answering gateway 3, which is connected to the modem 4 answering the telephony call. If an answer tone (ANS) or modified answer tone (ANSam) indication is received from the packet network 5 by the originating gateway 2, then the originating gateway 2 realizes 12 the answering gateway 3 has similarly received this tone from the answering modem 4. This tone indicates that the answering modem 4 is expecting a facsimile or data communication. Upon receiving the ANS or ANSam tone indication, the originating gateway 2 generates the ANS or ANSam tone toward the originating modem 1. Additionally, the originating gateway 2 enables a V.8 call menu (CM) detector and transitions to a G.711 pass-through mode of operation.

While in the G.711 pass-through mode, the originating gateway 2 monitors both the packet network 5 communications received from the answering gateway 3 and the telephony communications received from the originating modem 1. If the originating gateway 2 detects a V.8 CM synchronization sequence (e.g. 10 binary 1's), it suppresses the voice path towards the packet network and continues to decode the V.8 CM sequence form the originating modem. If the originating gateway 2 detects a data modem CM signal from the originating modem 1, prior to the expiration of the ANS/ANSam signal, then the originating modem 1 supports V.34+ data modulation protocols and the originating gateway 2 transitions to an LLMR processing state 15. On the other hand, if the originating gateway 2 detects a facsimile CM signal from the originating modem 1, prior to the expiration of the ANS/ANSam signal, the originating modem 1 is prepared to support a V.34 facsimile protocol 14. To support the V.34 facsimile call, the originating gateway 2 may either stay in the G.711 pass-through mode or transition to a V.34 facsimile relay processing mode of operation. Lastly, if the ANS/ANSam tone terminates before the originating gateway 2 receives a CM signal from the originating modem 1, the originating modem 1 supports non-V.34+ modulation protocols 13. In this event, the originating gateway 2: (1) discontinues sending the ANS/ANSam tone to the originating modem 1; (2) disables its CM detector; and (3) stays in the G.711 pass-through mode. Subsequently, if a facsimile relay message is received from the packet network 5, the originating gateway 2 transitions to a facsimile relay processing mode of operation 16.

Figure 4:
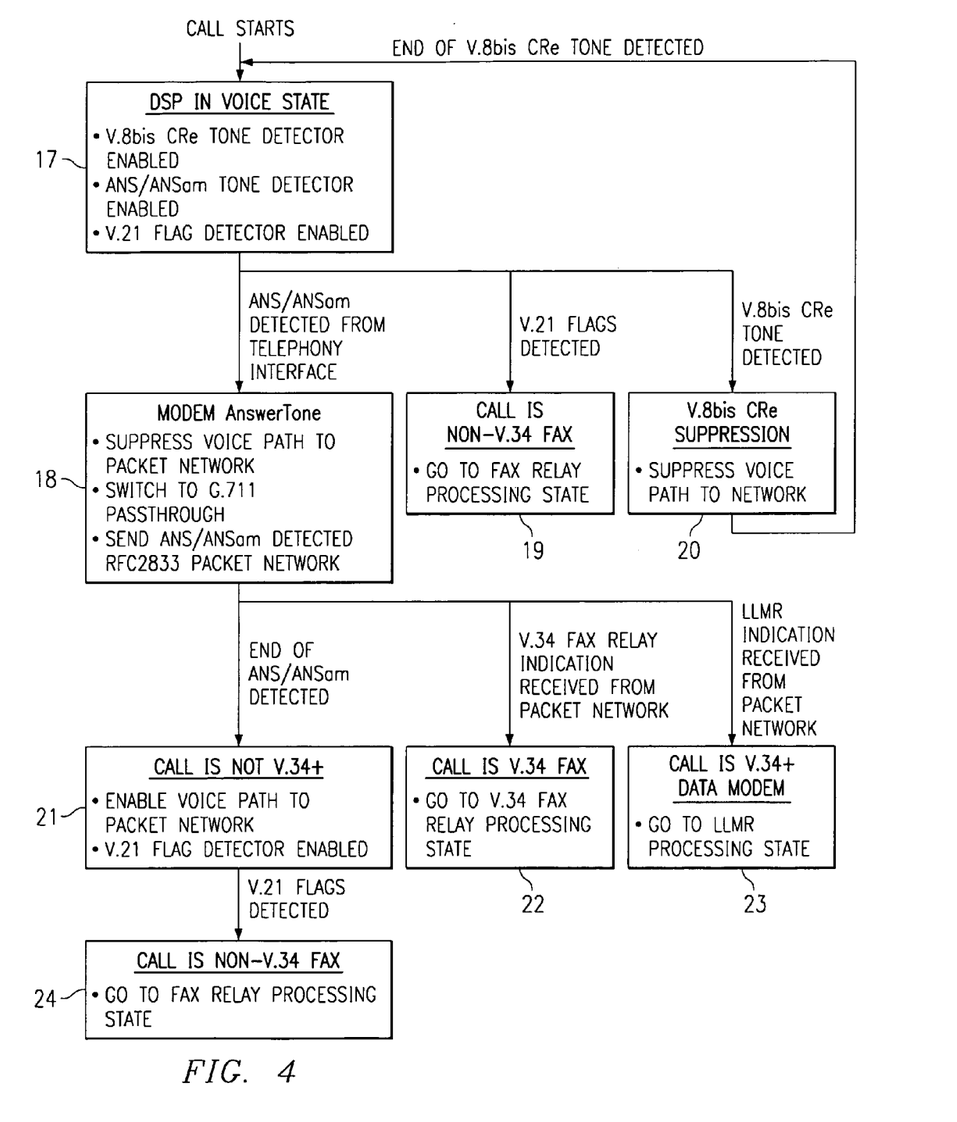
FIG. 4—illustrates the call discrimination algorithm performed by the call-answering gateway 3 of FIG. 1.

FIG. 4 illustrates the call discrimination algorithm performed by the call-answering gateway 3 of FIG. 1, which is connected to the modem 4 answering the telephony call. After a call connection is established, the answering gateway 3 is initialized to a voice mode of operation 17. While in this state, the answering gateway 3 enables its modem signal detectors that monitor the telephony link with the modem answering the telephony call. If a V.8bis CRe/MRe tone is detected 20, the answering gateway 3 suppresses the voice path to the packet network 5. When the CRe/MRe tone terminates, the answering gateway returns to the voice mode 17 and again monitors the telephony link with the answering modem 4 for a modem signal. If either an ANS tone or ANSam tone is received from the answering modem 4, then the answering gateway 3: (1) suppresses the voice path to the packet network 5; (2) transitions to a G.711 pass-through mode of operation; and (3) conveys the presence of the ANS/ANSam tone over the packet network 5 to the originating gateway 18 using a signaling event in accordance with RFC 2833.

While in the G.711 pass-through mode, the answering gateway 3 monitors both the telephony link with the answering modem 4 and the packet network 5 link with the originating gateway 2. If the answering gateway 3 detects an LLMR indication from the originating gateway 2, then the originating modem 1 is ready to support a V.34+ data modulation protocols and the answering gateway 3 transitions to an LLMR processing state 23. On the other hand, if the answering gateway 3 detects a V.34 facsimile relay indication from the originating gateway 2, the originating modem 1 is prepared to support a V.34 facsimile protocol and the answering gateway 3 transitions to a V.34 facsimile relay processing state 22. Lastly, if the ANS/ANSam tone terminates before the originating modem sends a CM signal, the originating modem 1 is only prepared to support non-V.34+ modulation protocols 21. In this event, the answering gateway 3 enables the voice path to the packet network 5 and enables its V.21 flag detector. Thereafter, if V.21 flags generated by the answering modem 4 are detected, the answering gateway 3 transitions to a facsimile relay processing state 24.

The following paragraphs describe the operation of the algorithm in relation to the communication protocols of various call scenarios.

In a first scenario, assume the answering modem 4 is a V.34+ data/facsimile modem. All V.34 and higher data modems and V.34 fax machines begin the communication connection by attempting to use a V.8 protocol. The answering modem 4 sends the modified answer tone, ANSam. If the originating modem 1 supports a V.8 protocol, it will respond to the ANSam tone with the CM signal. At this point, it may be assumed that both modems support at least V.34 (and LAPM for data modems). By analyzing the CM signal, the originating gateway 2 may further distinguish a facsimile call from a data modem call. Based on the CM detection and interpretation, a decision can be made to switch to LLMR in the case of a data modem call; or G.711 pass-through or V.34 fax relay processing in the case of a V.34 facsimile call. If the originating modem 1 does not support the V.8 protocol, it will:

1) respond with an AA signal if it is a V.32 data modem; or 2) not respond and continue to wait for the answering modem 4's action, if it is a data modem supporting modulations below V.32 or it is a non-V.34 facsimile machine.

If the answering modem 4 is a facsimile device, it will send HDLC flags using V.21 channel 2 after the answer tone. The detection of HDLC flags can be used to make the decision to switch to facsimile relay processing. By default, V.32 and lower-numbered data modem protocols will be supported using the G.711 pass-through mode of operation.

In a second scenario, assume the answering modem 4 is a V.32 or lower-numbered data modem protocol. If the answering device is a data modem that does not support a V.34 protocol, it will generate an unmodified answer tone, ANS. The originating modem 1 will respond with an AA signal, if it is a V.32 data modem. Otherwise, it will not respond but will await further action by the answering modem 4. In either case, this is a data modem call that will be supported using the G.711 pass-through mode of operation.

In a third scenario, assume the answering modem 4 is a V.17, V.29, or V.27 facsimile machine. If the answering modem 4 is a non-V.34 facsimile machine, it will generate an unmodified answer tone followed by HDLC flags using V.21 channel 2 modulation. Once the HDLC flags are detected by the answering gateway 3, the gateway 5 will transition to a facsimile relay processing state.

In a fourth scenario, assume the originating and answering modem 4s support K56Flex protocols. After establishing a call connection, the answering modem 4 will generate a CRe/MRe tone to initiate a V.8bis transaction in an attempt to negotiate the K56Flex capability. If the answering data modem does not receive a response from the originating gateway 2, it simply falls back to V.8 and begins generation of the ANSam. The suppression of CRe/MRe signal into the packet network is used to prevent the V.8bis transactions and hence the use of K56Flex.

In a preferred embodiment of the invention, the algorithm is implemented by host software within a gateway. All calls start in voice state. While in voice state, the gateway provides for the detection of the modem signals (ANS/ANSam, V.8 CM, and V.21 Flags) and RFC2833 support for the transmission of ANS/ANSam signals over the IP network. The detection events are provided to the host software which is responsible for interpreting tone/signal detection events and implementing the call discrimination and switch-over logic. The voice software incorporates the following features to support the call discrimination algorithm.

The voice software supports the transmission of the ANS and ANSam signals over the packet network 5 in accordance with RFC 2833.

Tone Detection Unit (TDU) software performs fast detection of a V.25/V.8 answer tone, allowing the MoIP gateway software to minimize the leakage of the signal over the voice path. The early detection is an event used by the gateway to suppress the voice path toward the packet network 5. After early detection, the TDU further qualifies the signal as an ANS with phase reversals, an ANS without phase reversals, an ANSam with phase reversals, and an ANSam without phase reversals. The qualified signal event is used to generate the proper RFC 2833 signal event toward the packet network 5. The TDU detects the loss of the answer tone signal on the telephony interface for generation of the RFC2833 event over the packet network 5.

Tone generation software provides the capability to locally generate the following modem signals based on the receipt of the RFC 2833 event from the packet network:

1) ANS without phase reversals;
2) ANS with phase reversals;
3) ANSam without phase reversals; and
4) ANSam with phase reversals.

The TDU provides the ability to detect and suppress the V.8bis CRe/MRe tone. Upon detection of a CRe/MRe tone, the voice path toward the path network is disabled. The voice path is re-enabled once the CRe/MRe tone has passed.

The TDU provides quick detection of a V.8 CM signal to minimize leakage of the signal over the packet network. The fast detection is used to suppress the voice path toward the packet network 5. The TDU receives and decodes the incoming CM signal and reports either a V.34 facsimile or V.34+ data modem indication, which is forwarded to the host processor. The TDU also performs the required V.21 flag detection.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A method of discriminating voice, data, and facsimile calls communicated through a voice-over-packet network, comprising:

providing an originating-side gateway, connected between an originating-side modem and a packet network;

providing an answering-side gateway, connected between an answering-side modem and the packet network;

identifying the existence of an answer signal (ANS) or a modified answer signal (ANSam) communicated between the answering modem and the originating modem over said packet network;

generating an ANS tone according to the protocols of said originating modem, using an originating-side gateway, when said existence of said ANS signal is identified by said answering-side gateway;

generating an ANSam tone according to the protocols of said originating modem, using said originating-side gateway, when said existence of said ANSam signal is identified by said answering-side gateway;

enabling a V.8 call menu signal (CM) detector after said existence of either of said ANS or ANSam signals is identified by said originating gateway;

transitioning said originating gateway from a voice mode of operation to a voice pass-through mode of operation after said existence of either of said ANS or ANSam signals is identified by said originating gateway;

if the originating gateway detects a V.8 CM signal from the originating modem prior to expiration of the ANS or ANSam signals, then:
  identifying, by the originating gateway, the CM call function as either a data modem CM signal from the originating modem or a facsimile CM signal from the originating modem; and
  if the CM call function is the data modem CM signal, transitioning the originating gateway into an LLMR processing state if the CM call function is the data modem CM signal, and if the CM call function is the facsimile CM signal, preparing the originating modem to support a V.34 facsimile protocol and transitioning the originating gateway to support the V.34 facsimile protocol in one of the voice pass-through mode and a V.34 facsimile relay mode.

2. The method of claim 1, further comprising:

if the originating gateway detects a V.8 CM signal subsequent to expiration of the ANS or ANSam signals, then:
identifying, by the originating gateway, the termination of the communication of said ANS or said ANSam signal;
terminating said generation of said ANS or said ANSam tone to the originating modem in preparation for a non-V.34 facsimile mode, when said termination of the communication of said ANS or said ANSam signal is identified; and
disabling said CM detector when said termination of the communication of said ANS or said ANSam signal is identified; and
transitioning said originating gateway to the non-V.34 facsimile relay processing mode of operation when a non-V.34 facsimile relay indication is received from said answering modem over said packet network.

3. A method of discriminating voice, data, and facsimile calls communicated through a voice-over-packet network, comprising:

providing an originating-side gateway, connected between an originating-side modem and a packet network;

providing an answering-side gateway, connected between an answering-side modem and the packet network;

identifying any one of an answer signal (ANS), a modified answer signal (ANSam), a V.8bis CRe/MRe tone, or V.21 flags communicated between answering modem and the originating modem, using the answering-side gateway that is capable of identifying each of said ANS signal, said ANSam signal, said V.8bis CRe/MRe tone, and said V.21 flags;

with said answering-side gateway, converting said identified ANS signal, ANSam signal, V.8bis CRe/MRe tone, or V.21 flags to a format that may be conveyed over said packet network to said originating modem via the originating-side gateway;

suppressing a voice path to said packet network, using said answering gateway, when said V.8bis CRe/MRe tone is identified;

determining when said V.8bis CRe/MRe tone communication between said answering modem and said originating modem terminates;

re-establishing said voice path when said V.8bis CRe/MRe tone terminates;

suppressing said voice path to said packet network, using said answering gateway, when said ANS signal or said ANSam signal is detected;

transitioning said answering gateway to a voice pass-through mode of operation when said ANS signal or said ANSam signal is detected;

transitioning said answering gateway to a data mode using an LLMR processing operation when an LLMR indication is received from the originating-side gateway;

transitioning said answering gateway to a V.34 facsimile processing mode of operation when said V.34 facsimile relay indication is received from the originating-side gateway;

re-establishing said voice path to said packet network, using said answering gateway, when a termination of the communication of either of said ANS or ANSam signals occurs; and transitioning said answering gateway to a facsimile relay processing mode of operation when said V.21 flags are identified.

4. A system, comprising:
a call-originating modem;
a call-originating gateway, connected between the call-originating modem and a packet network; and
a call-answering gateway, connected between a call-answering modem and the packet network,
wherein the system discriminates between one of a voice mode, a facsimile mode, and a data mode of operation between the originating modem and the answering modem over the packet network using an ANS/ANSam tone from the answering gateway and V.8 call menu (CM) signal from the originating modem,
the originating modem establishes a voice call to the answering modem and the originating gateway and the answering gateway enter the voice mode of operation,
when an ANS/ANSam (ANS) tone indication is received by the originating gateway from the answering modem via the answering gateway, the originating gateway generates an ANS tone to the originating modem, enables a V.8 CM detector, and
when the originating gateway, in voice mode, detects a V.8 CM synchronization sequence from the originating modem, the originating gateway suppresses the voice path to the packet network and decodes V.8 CM from originating modem to determine whether to transition to a facsimile mode or a data mode from the voice mode.

5. The system of claim 4, wherein when, after decoding the V.8 CM from the originating modem, the originating gateway detects a data modem CM signal from the originating modem prior to expiration of the received ANS signal, then the originating modem supports V.34+ data modulation and the originating gateway transitions to an LLMR processing state.

6. The system of claim 4, wherein when, after decoding the V.8 CM from the originating modem, the originating gateway detects a facsimile CM from originating modem prior to expiration of the received ANS signal, the originating modem is prepared for V.34 fax protocol and the originating gateway remains either in the voice codec pass-through mode or transitions to a V.34 fax relay mode.

7. The system of claim 4, wherein when the originating gateway, in voice mode, detects a termination of the received ANS tone prior to the originating gateway receiving the V.8 CM synchronization sequence from the originating modem, the originating gateway discontinues transmitting the ANS tone to the originating modem, disables CM detection, remains in voice codec pass through mode, and transitions to facsimile relay mode when a facsimile signal is received from the answering gateway.

8. The system of claim 4, wherein when the call is established in voice mode between the originating modem and answering modem and a V.21 flag is detected by the answering gateway from the answering modem, the answering gateway transitions to a non-V.32 facsimile relay mode.

9. The system of claim 4, wherein when the call is established in voice mode between the originating modem and answering modem and the answering gateway detects a V.8bis CRe tone from the answering modem, the answering gateway suppresses the voice path to the network and transitions to the data state, and when the V.8bis CRe tone ends from the answering modem, the answering gateway transitions to the voice mode state.

10. The system of claim 4, wherein, when the ANS/ANSam tone is received at the answering gateway from the answering modem, then the answering gateway suppresses the voice path to the network, transitions to voice codec pass-through mode, and transmits presence of the ANS/ANSam tone over the network to the originating gateway.

11. The system of claim 10, wherein when the answering gateway detects a V.34facsimile relay signal from the originating gateway, then the answering gateway transitions to a V.34 facsimile relay mode.

12. The system of claim 10, wherein when the answering gateway detects an LLMR signal from the originating gateway, then the answering gateway transitions to an LLMR processing mode.

13. The system of claim 10, wherein when the ANS signal is terminated from the answering modem, the answering gateway enables the voice path to the network and transitions to a facsimile relay mode when a V.21 flag is detected.

* * * * *